Patented Aug. 5, 1952

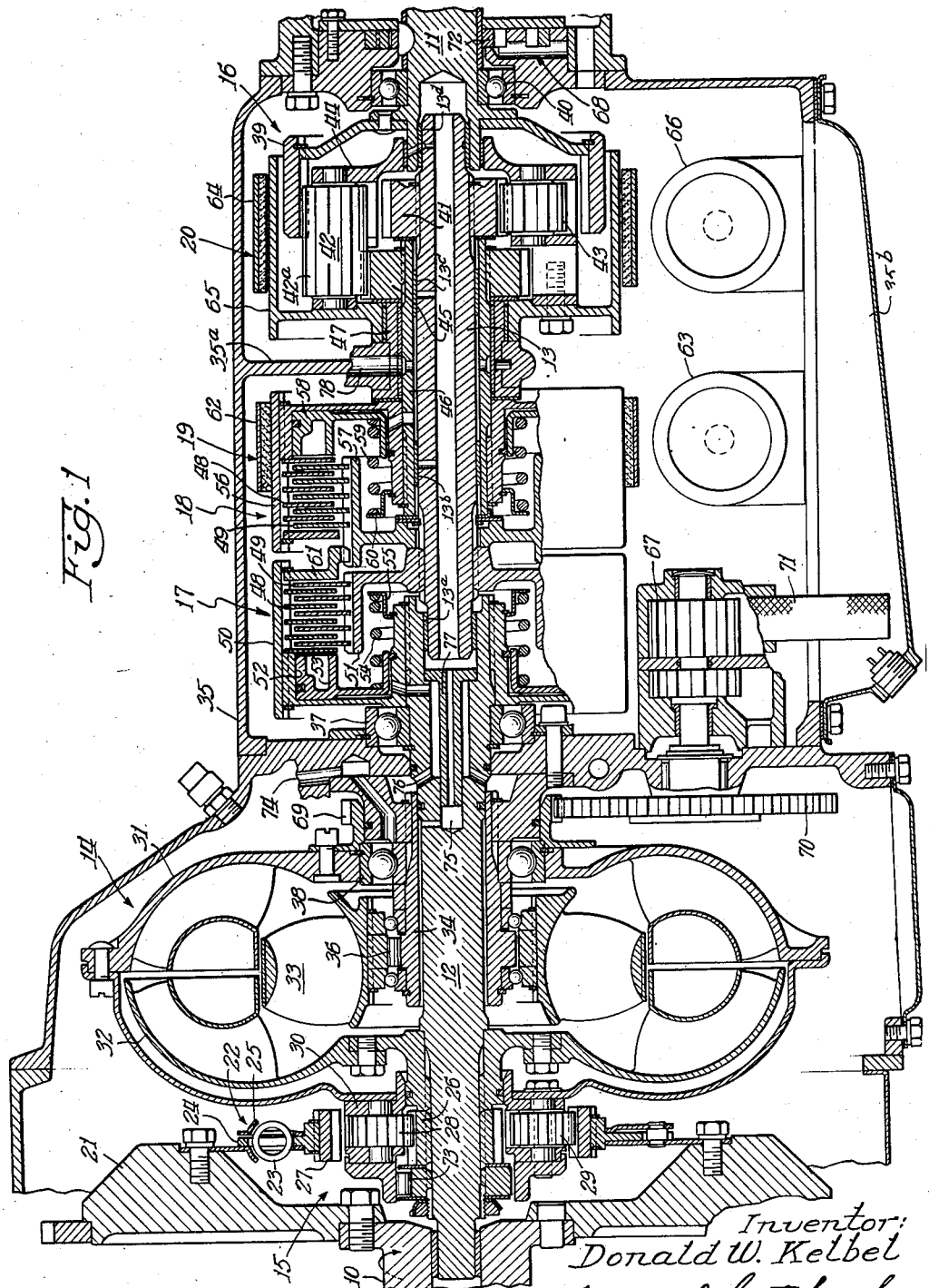

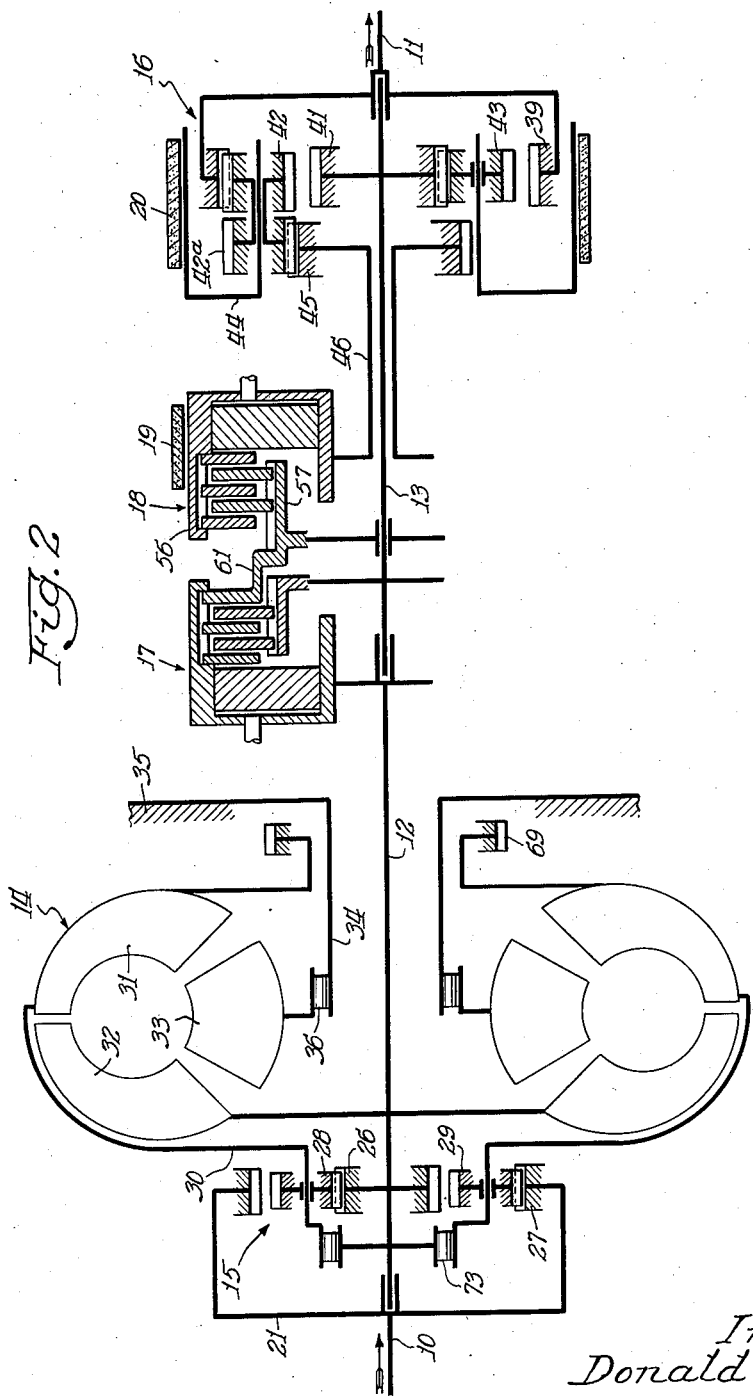

2,605,652

UNITED STATES PATENT OFFICE 2,605,652

TRANSMISSION

Donald W. Kelbel, Muncie, Ind., assignor to Borg-Warner Corporation, Chicago, Ill., a corporation of Illinois Application July 17, 1947, Serial No. 761,615

2 Claims. (Cl. 74—763)

My invention relates to transmissions for automotive vehicles and more particularly to such transmissions having hydrodynamic torque converters for completing the drive.

It is an object of my invention to provide an improved transmission of this type which includes gearing in series with a hydrodynamic coupling unit giving three different forward speed ratios. It is a further object to provide such gearing which is compact, is easily controlled, and is simple in nature. It is contemplated that this gearing shall be of the planetary type.

It is a further object of the invention to provide such gearing connected in series with a torque converter which is controlled by a plurality of frictionally engaging elements, such as friction clutches and friction brakes, and it is also an object to provide such gearing which provides three forward speeds and a drive in reverse with a minimum number of such frictionally engaging elements.

The invention consists of the novel constructions, arrangements, and devices to be hereinafter described and claimed for carrying out the above-stated objects and such other objects as will appear from the following description of a certain preferred embodiment illustrated in the accompanying drawings, wherein:

Fig. 1 is a longitudinal sectional view of a transmission embodying the principles of the invention, and Fig. 2 is a schematic view of the transmission illustrated in Fig. 1.

Like characters of reference designate like parts in the several views.

Referring now to the drawings, the illustrated transmission comprises in general an input shaft 10, an output shaft 11, an intermediate shaft 12, and a second intermediate shaft 13. The transmission is intended to be useful particularly with automotive vehicles, and the input shaft 10 is intended to be connected with a driving engine (not shown) of such a vehicle, and the output shaft 11 is intended to be connected with the drive wheels (not shown) of the vehicle. The input shaft 10 is connected to drive a hydrodynamic torque converter 14 by means of a planetary speed-up gear set 15. The shaft 12 is driven by the torque converter and is adapted to drive a planetary gear set 16. A pair of friction clutches 17 and 18 are provided for selectively connecting the shaft 12 with different elements of the gear set 16, and friction brakes 19 and 20 are provided for braking certain elements of the gear set to provide reaction members in the gear set.

The input shaft 10 drives a flywheel 21, and the flywheel is connected to the speed-up gearing 15 by means of a vibration dampener 22. The vibration dampener comprises springs 23 acting between opposite parts 24 and 25, and the type of dampener shown is well known in the art and, therefore, need not be described more in detail.

The planetary gear set 15 comprises a sun gear 26, a ring gear 27, and a pair of planet gears 28 and 29. The planet gears 28 and 29 are in mesh with each other, and the gear 29 is also in mesh with the ring gear 27, and the gear 28 is also in mesh with the gear 26. The planet gears 28 and 29 are rotatably mounted in a planet gear carrier 30. The ring gear 27 is connected to be driven by the vibration dampener 22, and the sun gear 26 is splined to the intermediate shaft 12. The planet gear carrier 30 is connected with the torque converter 14, as will hereinafter be described more in detail.

The torque converter 14 comprises an impeller or driving element 31, a rotor or driven element 32, and a stator or reaction element 33. The impeller 31 is connected to the planet gear carrier 30 of the gear set 15, and the rotor 32 is splined to the shaft 12. The stator 33 is rotatably disposed on a central hub 34 which is fixed with respect to the casing 35 of the transmission. A one-way roller brake 36 is provided between the hub 34 and the stator 33 for allowing the stator to rotate only in the forward direction for purposes well known in the transmission art. The intermediate shaft 12 is rotatably disposed with respect to the casing 35 by means of a bearing 37, and this shaft is piloted in the drive shaft 10 as shown. The impeller is rotatably disposed on the central hub 34 by means of a bearing 38, as will be noted.

The planet gear set 16 comprises a ring gear 39 connected with the output shaft 11 and, as will be noted, the ring gear and the output shaft are rotatably disposed within the casing 35 by means of a bearing 40. The gear set includes also a sun gear 41 splined to the second intermediate shaft 13 which, as will be noted, is piloted within the shafts 11 and 12. A pair of planet gear pinions 42 and 43 in mesh with each other are provided, and the gear 42 is also in mesh with the ring gear 39, and the gear 43 is also in mesh with the sun gear 41. The gears 42 and 43 are rotatably mounted in a planetary gear carrier 44 which is rotatably disposed with respect to the shafts 11 and 13. The pinion gear 42 is provided with a gear portion 42a which extends forwardly of the transmission with respect to that portion of the gear in mesh with the gear 43, and a sun gear 45 is provided in mesh with the gear portion 42a. The sun gear 45 is splined on a shaft 46 which is rotatably disposed on the intermediate shaft 13. It is to be noted that the carrier 44 is rotatably mounted with respect to the shaft 46 by means of an intermediate collar 47, and this collar is supported by a portion 35a of the casing 35.

The friction clutch 17 is provided for drivingly connecting the shaft 13 with the shaft 12 and comprises a plurality of friction plates 48 and 49. The clutch comprises an outer shell 50 to which the plates 48 are splined and an inner shell 51 to which the plates 49 are splined. The outer shell 50 is splined to the shaft 12 and the inner shell 51 is splined to the shaft 13. The outer shell 50 is provided with an annular cavity 52 in which a piston 53 of the same general shape is disposed. The piston is adapted to be moved by fluid under pressure applied thereto, as will be henceforth more fully described, so as to move the friction plates 48 and 49 together for engaging the clutch 17. A spring 54 is provided between the piston and a collar 55 fixed to the shell 50, and this spring functions to move the piston 53 into its retracted position, in which it is shown in the drawings.

The clutch 18 is generally similar to the clutch 17 and comprises an outer shell 56, an inner shell 57, clutch plates 48 and 49 splined respectively to the outer and inner shells, a fluid pressure-operated piston 58, a spring 59 acting on the fluid piston, and a retainer collar 60 for the spring. The outer shell 56 is splined to the shaft 46 and the inner shell 57 fits on and is rotatably disposed with respect to the shaft 13. A bridging member 61 is provided for connecting the outer shell 50 of the friction clutch 17 with the inner shell 57 of the friction clutch 18 so that these two parts rotate together and the friction plates 48 of the clutch 17 and the friction plates 49 of the clutch 18 act as the driving plates in the respective clutches.

The friction brake 19 comprises a brake band 62 which acts on the outer shell 56 of the clutch 18, thereby braking the hollow shaft 46 and the sun gear 45. The brake 19 may be actuated by any suitable means, such as by a fluid pressure actuator 63 of any suitable construction. The brake 20 comprises a brake band 64 acting on a drum 65 which is provided on the planet gear carrier 44. This brake band may also be actuated by a fluid pressure actuator 66 of any suitable construction.

The transmission is provided with two fluid pressure pumps 67 and 68 which may be of the gear or any other suitable type. The pump 67 is driven by gears 69 and 70, as shown. The gear 69 is fixed with respect to the impeller 31 of the converter 14 and meshes with the gear 70 which is connected directly to the pump 67. The inlet 71 of the pump 67 extends into the lower portion 35b of the transmission casing 35. Since the gear 69 rotates with the impeller 31 of the converter 14, it is apparent that this pump is driven by the input shaft 10. The pump 68 comprises a gear 72 which is splined to the output shaft 11, and this pump thus is driven by this shaft. The pumps may be connected with any suitable hydraulic system (not shown) for actuating the clutches 17 and 18 and the brakes 19 and 20.

A one-way roller clutch 73 is provided between the intermediate shaft 12 and the planet gear carrier 30 of the gear set 15. This roller clutch is so constructed that when the carrier 30 is rotating in the forward direction and the intermediate shaft 12 is rotating at the same or slower speed in the same direction, the roller clutch is disengaged, but if the shaft 12 is driven (as from the output shaft 11, as will be described in more detail hereinafter), the clutch engages and rotates the carrier in the forward direction.

A fluid conduit 74 is provided in the casing 35 for supplying the torque converter 14 with fluid under pressure. Various bearing portions of the intermediate shaft 13, indicated at 13a, 13b, 13c, and 13d, are lubricated by fluid which is derived from the torque converter 14 through a passage 75. The fluid intended to be used in the torque converter, in accordance with ordinary practice, is oil, and hence the surfaces 13a, 13b, 13c, and 13d are properly lubricated. A fluid passage 76 is provided in the intermediate shaft 12, being formed by a plug-like member 77, and this passage is in communication with the annular cavity 52 in the outer shell 50 of the friction clutch 17 for supplying fluid under pressure to the piston 53 for engaging the clutch 17. A fluid passage 78 is provided in the casing portion 35a and is defined by the shafts 46 and 13 and is in communication with the annular cavity in the shell 56 of the friction clutch 18, providing fluid under pressure to the piston 58 for engaging the friction clutch 18.

The illustrated transmission provides three speeds in forward drive and a drive in reverse. The intermediate shaft 12 is driven in all of these speeds by means of the torque converter 14, and this shaft functions as a drive shaft for the planetary gearing 16 in all of the speeds. The torque converter 14 is of the usual hydrodynamic type and functions, as is well known, to drive its driven element 32 and its driven shaft 12 at increased torques in low speed ranges, and the converter functions as a simple two-element fluid coupling in higher speed ranges. The torque converter 14 is filled with fluid by means of the passage 74 when the converter is driving, as will be understood. The stator 33 functions to change the direction of the flow of fluid within the converter, and this element functions as a reaction element, being held stationary by the one-way brake 36 in torque converting ranges, and the stator rotates along with the impeller and rotor when the converter functions as a simple fluid coupling, with the one-way brake 36 overrunning.

The torque converter is driven by means of the planetary speed-up gearing 15. In starting a vehicle in which the transmission is installed, the shafts 11, 12 and 13 are stationary, and since the sun gear 26 is splined to the shaft 12, it also is stationary, and rotation of the ring gear 27 by means of the shaft 10 causes a rotation of the carrier 30 and thereby the impeller 31 in the forward direction at a speed greater than the speed of the shaft 10. This is due to the fact that the planet gear set 15 includes the dual pinions 28 and 29 and is in accordance with the operation explained more in detail in A. G. Schneider Patent No. 2,333,681. This causes an increased torque to be transmitted to the driven shaft 12 of the converter at lower speeds of the input shaft 10 than would otherwise be the case if this speed-up gearing were not used. After the shaft 12 and any parts driven thereby begin rotation, the speed of the impeller 31 becomes more nearly equal to the speed of the input shaft 10, and the shafts 10 and 12 and the impeller 31 and rotor 32, together with the parts of the planetary gear set 15, all rotate at substantially the same speed when the converter functions in the higher speed ranges of the shafts 10 and 12 as a simple fluid coupling. When the shaft 12 is rotating, there are two paths of power flow, one being through the torque converter 14 and the other being directly through the planet gear set 15, as is described more in detail in the above-mentioned Schneider patent.

A neutral condition in the transmission is provided when both of the clutches 17 and 18 and both of the brakes 19 and 20 are disengaged. A neutral condition is also provided if only one of the four engageable elements is engaged while keeping the other engageable elements in disengaged condition. This is due to the fact that engagement of at least two of the engageable elements is necessary for a power train to be completed between the shafts 12 and 11, as will be hereinafter described.

Low speed forward drive is provided by engagement of the clutch 17 and the brake 20, with the clutch 18 and brake 19 being disengaged. The clutch 17 being engaged connects the shaft 12 with the intermediate shaft 13 and thereby with the sun gear 41. The brake 20 is engaged and thereby holds the planet gear carrier 44 of the gear set 16 stationary, and the gear carrier functions as the reaction element of the gear set. Rotation of the sun gear 41 in the forward direction from the drive shaft 12 causes a rotation of the ring gear 39 and thereby the output shaft 11 in the forward direction at a decreased speed. The sun gear 41 and the ring gear 39 rotate in the same direction due to the fact that the dual planet gear pinions are provided between these gears.

Second or intermediate speed forward drive is provided by disengaging brake 20 and engaging brake 19. The brake 19 functions to hold the sun gear 45 acting on the planet gear portion 42a stationary, and the sun gear thereafter functions as the reaction member of the gear set. Rotation of the sun gear 41 from the drive shaft 12 functions to drive the ring gear 39 in the forward direction at a speed faster than that speed provided when the brake 20 is engaged and the planet gear carrier 44 incidentally rotates forwardly at some reduced speed.

Third speed forward or direct drive is provided by disengaging the brake 19 and engaging the friction clutch 18. The friction clutch 18, when engaged, functions to connect the larger sun gear 45 through the outer and inner shells 56 and 57 of the clutch 18, the bridging member 61 and the outer shell 50 of the clutch 17 with the drive shaft 12. The clutch 17, remaining engaged, connects the sun gear 41 with the drive shaft 12, as has been described. Therefore, with both the clutches 17 and 18 being engaged, both sun gears 45 and 41 are connected to the drive shaft 12 and the planet gear set is thereby put into locked-up condition in which none of the parts of the gear set rotates relative to the others, and a direct one-to-one drive is provided between shafts 12 and 11.

Reverse drive is provided by engaging the clutch 18 and the brake 20, with the clutch 17 and the brake 19 being disengaged. The shaft 12 by means of the clutch 18 drives the sun gear 45, and the brake 20 being engaged, the planet gear carrier 44 functions as the reaction element of the gear set 16. Only the planet gear pinion 42 with its portion 42a is effective between the sun gear 45 and the ring gear 39, and, therefore, the ring gear 39 and the shaft 11 connected therewith are rotated in the reverse direction at a reduced speed ratio.

The input shaft 10 and thereby an engine (not shown) connected therewith may be rotated in the forward direction, as for starting the engine, by conditioning the gear set 16 for any one of its forward speed drives and driving the output shaft 11, as by pushing or towing the vehicle in which the transmission is installed. In this case the drive is not through the torque converter 14 from the shaft 12 to the shaft 10, but rather proceeds through the planet gear set 15 and the one-way clutch 73. The planet gear carrier 30 being connected through this clutch with the shaft 12, and the sun gear 26 of this gear set also being connected with this shaft, cause a locking up of the gear set so that for this direction of drive from the output shaft 11 to the input shaft 10, the shafts 12 and 10 rotate together in a one-to-one drive. It is, therefore, not necessary to drive the shaft 10 and an engine connected therewith for starting purposes through the hydraulic device 14 which inherently has some slip between its driving and driven elements.

The illustrated transmission advantageously provides three forward geared speeds in series with a fluid torque converter. All of these speeds are two-way, that is, the drive shaft 12 not only drives the output shaft 11 at these three speeds, but, when the transmission is conditioned for any of them, the output shaft drives the drive shaft and thereby the input shaft 10 through the converter also at these speed ratios. An automotive vehicle with this transmission may thus utilize the engine of the vehicle as a braking means in any of the three speeds. Each of the three speeds, furthermore, is completed by friction devices which allow a smooth shifting from one speed ratio to another or from neutral to any of the speed ratios. The gear box is advantageously simple in design, utilizing only one gear set, namely, the planetary gearing 16. It will be noted that for direct drive, in which the transmission is used most of the time, the two friction clutches 17 and 18 are both engaged, and there is thus a minimum of power loss in these friction clutches. The transmission, as a whole, has a minimum number of control elements, namely, only the two friction clutches and the two friction brakes, and this simplicity works for economy of manufacture.

I wish it to be understood that my invention is not to be limited to the specific constructions and arrangements shown and described except only insofar as the claims may be so limited, as it will be apparent to those skilled in the art that changes may be made without departing from the principles of the invention.

I claim:

1. In a transmission, the combination of a drive shaft, a driven shaft, a planetary gear set having first and second driving elements and a third driven element, said third element being connected to said driven shaft, means for completing a one to one drive power train between said shafts and including a first clutch for connecting said first element with said drive shaft and a second clutch for connecting said second element with said drive shaft which complete the one to one power train when both are engaged, inner and outer concentric shafts connected respectively with said first and second elements, each of said clutches comprising an inner cylindrical part and an outer cylindrical part, the inner part of each clutch having a plurality of clutch discs fastened to it on its outer periphery and the outer part of each clutch having a plurality of clutch discs fastened to it on its inner periphery and interleaved with the first named clutch discs for frictional engagement therewith to connect the inner and outer parts of the clutch together, the outer part of said first clutch being connected to the inner part of said second clutch and to said drive shaft, the inner part of said first clutch being connected to said inner concentric shaft and thereby to said first driving element and the outer part of said second clutch being connected to said outer concentric shaft and thereby to said second driving element, and means for completing a change speed drive between said drive and driven shafts including a brake for said second driving element, and said first clutch, said first clutch and brake completing the change speed power train when both are engaged, the outer peripheral surface of the outer part of said second clutch defining a smooth cylindrical brake drum, and said brake comprising a friction band engageable with the outer peripheral surface of said drum.

2. In a transmission, the combination of a drive shaft, a driven shaft, a planetary gear set having first and second sun gears and a ring gear which is connected with said driven shaft, means for completing a one to one drive power train between said shafts and including a first clutch for connecting said first sun gear with said drive shaft and a second clutch for connecting said second sun gear with said drive shaft which when both are engaged complete the one to one power train, inner and outer concentric shafts connected with said first and second sun gears respectively, said clutches each comprising an inner cylindrical shell and an outer cylindrical shell, the inner shell of each clutch having a plurality of clutch discs fastened to it on its outer periphery and the outer shell of each clutch having a plurality of clutch discs fastened to it on its inner periphery and interleaved with the first named clutch discs for frictional engagement therewith to connect the inner and outer shells of the clutch together, the outer shell of said first clutch being connected to the inner shell of said second clutch and to said drive shaft, the inner shell of said first clutch being connected to said inner concentric shaft and thereby to said first sun gear and the outer shell of said second clutch being connected to said outer concentric shaft and thereby to said second sun gear, means for completing a change speed power train between said drive and driven shafts including said first clutch and a brake for said second sun gear, said first clutch and said brake completing the change speed power train when both are engaged, the outer peripheral surface of the outer shell of said second clutch defining a smooth cylindrical brake drum, and said brake comprising a friction band engageable with the outer peripheral surface of said drum, and hydraulic means including a fluid pressure actuated piston for engaging each of said clutches.

DONALD W. KELBEL.

REFERENCES CITED

The following references are of record in the file of this patent:

UNITED STATES PATENTS

| Number | Name | Date |
|---|---|---|
| 752,953 | Brush | Feb. 23, 1904 |
| 1,814,297 | Backer | July 14, 1931 |
| 2,034,988 | Nilsson | Mar. 24, 1936 |
| 2,150,950 | Thoma | Mar. 21, 1939 |
| 2,220,174 | Ravigneaux | Nov. 5, 1940 |
| 2,235,370 | Jandasek | Mar. 18, 1941 |
| 2,333,680 | Schneider | Nov. 9, 1943 |
| 2,333,681 | Schneider | Nov. 9, 1943 |
| 2,351,213 | James | June 13, 1944 |
| 2,421,190 | Dodge | May 27, 1947 |
| 2,436,071 | Matulaitis | Feb. 17, 1948 |

FOREIGN PATENTS

| Number | Country | Date |
|---|---|---|
| 9,489 | Great Britain | May 1, 1908 |
| 154,694 | Great Britain | Nov. 30, 1920 |
| 48,019 | France | Oct. 16, 1937 |
| | (Addition to No. 809,102) | |